United States Patent
Pou et al.

(10) Patent No.: US 9,951,428 B2
(45) Date of Patent: Apr. 24, 2018

(54) ANTI-CORROSION FORMULATIONS THAT ARE STABLE DURING STORAGE

(71) Applicant: Arkema France, Colombes (FR)

(72) Inventors: Tong Eak Pou, Irigny (FR); Jean Francois Devaux, Soucieu en Jarrest (FR)

(73) Assignee: Arkema France, Colombes (FR)

( * ) Notice: Subject to any disclaimer, the term of this patent is extended or adjusted under 35 U.S.C. 154(b) by 0 days.

(21) Appl. No.: 14/892,736

(22) PCT Filed: May 23, 2014

(86) PCT No.: PCT/FR2014/051218
§ 371 (c)(1),
(2) Date: Nov. 20, 2015

(87) PCT Pub. No.: WO2014/191666
PCT Pub. Date: Dec. 4, 2014

(65) Prior Publication Data
US 2016/0090655 A1  Mar. 31, 2016

(30) Foreign Application Priority Data
May 27, 2013  (FR) ..................................... 13 54750

(51) Int. Cl.
| | |
|---|---|
| *C23F 11/00* | (2006.01) |
| *C23F 11/14* | (2006.01) |
| *C09K 8/54* | (2006.01) |
| *C23F 11/10* | (2006.01) |
| *C23F 11/16* | (2006.01) |

(52) U.S. Cl.
CPC ............. *C23F 11/149* (2013.01); *C09K 8/54* (2013.01); *C23F 11/00* (2013.01); *C23F 11/10* (2013.01); *C23F 11/141* (2013.01); *C23F 11/161* (2013.01)

(58) Field of Classification Search
CPC ............................ C23F 11/141; C23F 11/149
See application file for complete search history.

(56) References Cited

U.S. PATENT DOCUMENTS

| | | |
|---|---|---|
| 4,498,997 A | 2/1985 | Walker |
| 4,578,208 A | 3/1986 | Geke |

(Continued)

FOREIGN PATENT DOCUMENTS

| | | |
|---|---|---|
| EP | 2267098 | 12/2010 |
| WO | 9408980 | 4/1994 |

(Continued)

OTHER PUBLICATIONS

International Search Report for International Application No. PCT/FR2014/051218 dated Aug. 21, 2014.

*Primary Examiner* — Kevin Joyner
(74) *Attorney, Agent, or Firm* — RatnerPrestia

(57) ABSTRACT

The present invention relates to formulations for inhibiting the corrosion of the metals used in the oil industry, and more generally in all types of industries for drilling for fossil compounds or ores, such as gas or oil. The corrosion-inhibiting formulations are stable during storage, and have improved properties due to the presence of at least one compound having at least one triazine unit. The invention also relates to the use of at least one compound comprising at least one triazine unit in a corrosion-inhibiting formulation, as well as to the use of said corrosion-inhibiting formulation in the oil, gas and mining industry.

17 Claims, 1 Drawing Sheet

(56) References Cited

U.S. PATENT DOCUMENTS

| | | | |
|---|---|---|---|
| 4,978,512 | A | 12/1990 | Dillon |
| 5,554,349 | A | 9/1996 | Rivers |
| 5,744,024 | A | 4/1998 | Sullivan, III |
| 5,853,619 | A | 12/1998 | Watson |
| 6,395,225 | B1 | 5/2002 | Pou |
| 2005/0238556 | A1 | 10/2005 | Pakulski |
| 2010/0261623 | A1 | 10/2010 | Cassidy |
| 2011/0186299 | A1 | 8/2011 | Pou |
| 2013/0118996 | A1 | 5/2013 | Kaplan |
| 2014/0216748 | A1 | 8/2014 | Pou |
| 2014/0343332 | A1 | 11/2014 | Pou |

FOREIGN PATENT DOCUMENTS

| | | |
|---|---|---|
| WO | 9841673 | 9/1998 |
| WO | 0112878 | 2/2001 |
| WO | 2010031963 | 3/2010 |
| WO | 2013034846 | 3/2013 |
| WO | 2013038100 | 3/2013 |

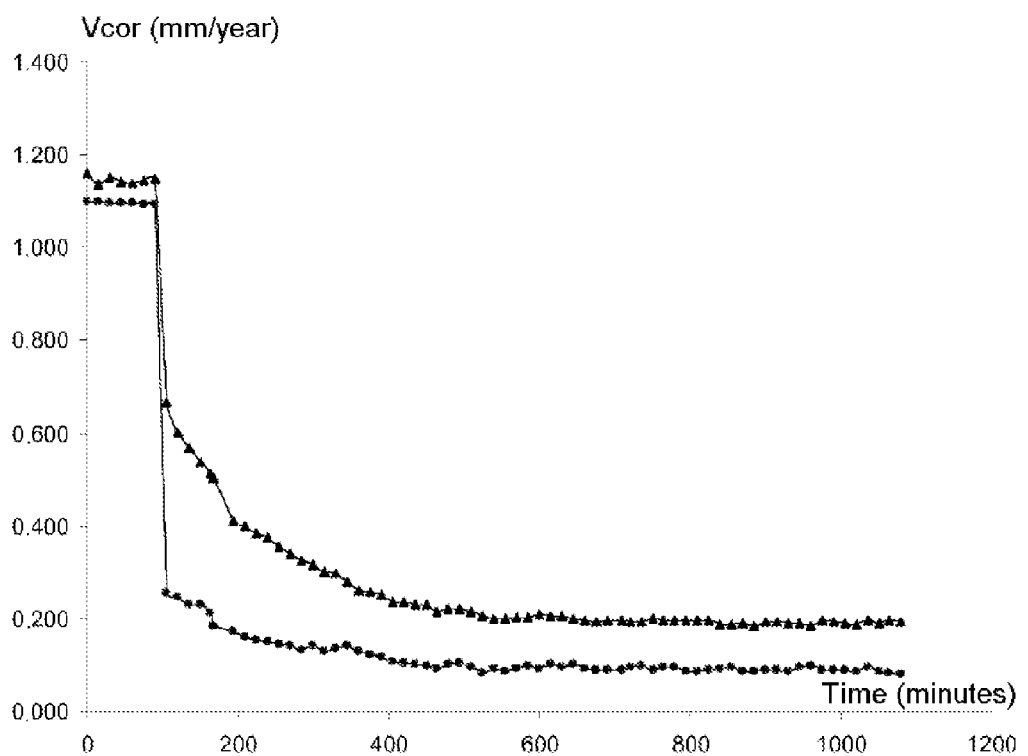

ANTI-CORROSION FORMULATIONS THAT ARE STABLE DURING STORAGE

CROSS-REFERENCE TO RELATED APPLICATIONS

This application is the national phase of International Application No. PCT/FR2014/051218, filed May 23, 2014, which claims priority to French Application No. 1354750, filed May 27, 2013. The entire disclosures of each of these applications are incorporated herein by reference in their entirety for all purposes.

FIELD OF THE INVENTION

The present invention relates to compositions that inhibit the corrosion of metals used in the oil and gas industry, and more specifically in any type of industry for the drilling, completion, stimulation and production of ore or fossil compounds, such as gas, petroleum, bitumen and the like.

BACKGROUND OF THE RELATED ART

Such corrosion-inhibiting compositions are already widely known and the most efficient of them usually comprise one or more sulfur derivatives, chosen especially from mercapto alcohols and mercapto acids. Thus, patent applications WO 1998/041673, WO 2013/034846 and WO 2013/038100 describe corrosion-inhibiting compositions in which the addition of sulfur derivatives, for example thioglycolic acid, makes it possible to increase the performance of said inhibiting compositions.

However, it has been observed that corrosion-inhibiting compositions comprising one or more sulfur derivatives, such as those defined above, and in particular thioglycolic acid, are sparingly stable on storage, and have a tendency to develop undesired nauseating odors.

These nauseating odors are probably due to the decomposition of the sulfur compounds, and, without being bound by theory, it is now thought that the sulfur derivatives probably partly decompose into hydrogen sulfide ($H_2S$) at the storage temperature. The higher the storage temperature, the greater the decomposition of the sulfur derivatives, and in particular when thioglycolic acid is concerned. This decomposition phenomenon thus makes these corrosion-inhibiting compositions sparingly usable on account of the unpleasant odors given off, which may even be hazardous to users. Specifically, hydrogen sulfide is toxic, even at very low concentrations in air.

The gas and oil industry already uses certain compounds known as $H_2S$ scavengers, where they are mainly used by injection into gas, crude oil or water or aqueous fluid pipelines, in order to scavenge (trap, or neutralize) the acidic species present in said pipelines.

These acidic species are mainly due to the presence of moisture and of "acidic" gases, for instance hydrogen sulfide ($H_2S$) and carbon dioxide ($CO_2$) in the presence of $H_2S$.

In this field, it is now commonly established to classify $H_2S$ scavengers in two major families, regenerative scavengers and non-regenerative scavengers.

Among the regenerative $H_2S$ scavengers, examples that may be mentioned include alkanolamines such as monoethanolamine, diethanolamine or methylethanolamine.

Among the non-regenerative $H_2S$ scavengers, examples that may be mentioned include triazines and derivatives thereof, oxidizing agents such as chlorine dioxide, hypochlorites (for example bleach), hydrogen peroxide, transition metal salts (such as iron, cobalt, nickel, chromium, copper, zinc or manganese salts, and the like), or aldehydes, such as formaldehyde and glyoxal.

It might thus be envisaged to use such $H_2S$ scavengers for trapping sulfides resulting from the decomposition of the sulfur derivatives present in corrosion-inhibiting compositions. However, the majority of the regenerative scavengers and non-regenerative scavengers suffer from numerous drawbacks that make them unsuitable for use in corrosion-inhibiting compositions.

Thus, amine derivatives, and in particular alkanolamines, are not efficient enough to remove $H_2S$ derived from the degradation of thioglycolic acid. Oxidizing agents, such as chlorine dioxide, bleach or hydrogen peroxide are difficult to use on account of their corrosiveness, which goes against the desired aim. In addition, the formation of insoluble solids with some of these $H_2S$ scavengers and thioglycolic acid in anticorrosion formulations makes these formulations unsuitable for use, since any risk of blocking and clogging of the injection tubes and pipes must be avoided at all costs. Moreover, aldehydes, such as formaldehyde and glyoxal, are toxic and it is sought to minimize or even to avoid their use.

SUMMARY OF THE INVENTION

Thus, one aim of the present invention is to provide anticorrosion formulations comprising at least one sulfur derivative and which are stable on storage, i.e. which generate little or no unpleasant odor over time. Another aim of the present invention is to provide stable anticorrosion formulations that are particularly suitable and efficient for preventing and treating corrosion in the field of oil, gas and ore extraction in general.

Another aim of the invention is to provide stable anticorrosion formulations that are suitable and efficient for preventing and treating corrosion in the field of oil, gas and ore extraction, said formulations being nontoxic or sparingly toxic, i.e. comprising few or no compounds that might prove to be toxic, hazardous and/or harmful to the environment, or not decomposing into compounds that are toxic, hazardous and/or harmful to the environment during the storage of said formulations over time.

The inventors have now discovered that the abovementioned aims are totally or at least partly achieved by means of the formulations according to the invention as will be presented in the description that follows. Other aims will emerge in this same description.

Among the abovementioned $H_2S$ scavengers that are already available on the market, it has in fact been discovered that certain triazines and certain derivatives thereof are capable of stabilizing corrosion-inhibiting formulations comprising at least one sulfur compound. The addition of at least one compound bearing at least one triazine unit to an anticorrosion formulation not only gives said formulation excellent stability on storage, without giving off unpleasant odors, without deposition, but also does so without disrupting and without modifying the anticorrosion efficiency of said formulation. In addition, and entirely surprisingly, it has been observed that the anticorrosion activity of a formulation can be substantially improved when it is supplemented with at least one compound bearing at least one triazine unit.

This is all the more surprising since the literature provides numerous documents (cf. for example, U.S. Pat. No. 5,554,349 and U.S. Pat. No. 4,978,512) mentioning the use of triazine derivatives for scavenging $H_2S$ by direct injection into oil or gas pipelines, but none of them mentions the presence of triazine (or derivative) among the components of corrosion-inhibiting formulations comprising at least one sulfur compound, for example thioglycolic acid or equivalents thereof, and none of them mentions corrosion-inhibiting formulations comprising at least one sulfur compound and at least one triazine (or derivative) in order to make said formulations stable on storage, without impairing their anticorrosion efficiency.

Thus, and according to a first aspect, the present invention relates to a corrosion-inhibiting formulation comprising:
a) at least one amine or amine derivative,
b) at least one sulfur compound, and
c) at least one compound bearing at least one triazine unit.

The corrosion-inhibiting formulation may also optionally comprise a component d) which is a solvent or a mixture of two or more solvents, the solvent(s) preferably being chosen from water and water-soluble organic solvents, and in particular organic solvents of alcohol and/or glycol type.

In general:
component a) represents from 50% to 90% by weight, preferably from 55% to 85% by weight, more preferably from 55% to 75% by weight, limits inclusive, relative to the total weight of components a)+b)+c),
component b) represents from 1% to 30% by weight, preferably from 2% to 20% by weight, more preferably from 5% to 10% by weight, limits inclusive, relative to the total weight of components a)+b)+c),
component c) represents from 0.5% to 15% by weight, preferably from 0.5% to 10% by weight, more preferably from 1% to 5%, limits inclusive, relative to the total weight of components a)+b)+c),
component d) represents from 0% to 60% by weight, preferably from 20% to 60% by weight, more preferably from 30% to 60% by weight, limits inclusive, relative to the total weight of components a)+b)+c)+d).

Thus, the corrosion-inhibiting formulations of the prior art, and, as nonlimiting examples, those described in patent applications WO 1998/041673, WO 2013/034846, WO 2013/038100, U.S. Pat. No. 5,853,619 and WO 2001/12878, to which at least one compound bearing at least one triazine unit is added, form part of the present invention.

DETAILED DESCRIPTION OF CERTAIN EMBODIMENTS OF THE INVENTION

The components a) of the formulations of the present invention are the nitrogen derivatives commonly used as corrosion inhibitors in the oil and gas industry. Among these components a), nonlimiting examples that may be mentioned include amines, ethoxylated amines, amino acids, imidazolines, and also derivatives thereof and salts thereof, and in particular the alkyl-imidazo-polyethylene-amines described in patent application WO 1998/041673, the imidazoline-amine carboxylates described in patent application WO 2010/031963, quaternary alkylimidazolines, alkoxylated alkylimidazolines, fatty amines, fatty amine derivatives (amino acids, amino alcohols, amidoamines, ammoniums, quaternary ammoniums, pyridines and derivatives, for instance pyridiniums, quinolines and derivatives, for instance quinoliniums), imidazolines substituted with at least one fatty chain, ester amines, ether amines described in patent application WO 2013/034846, or MOPA (methoxy-3-propylamine), EDIPA (N,N-di-iso-propylethylamine), the alkylamines described in patent application WO 2013/038100, and also oxy-alkylated amines (for example oxyethylated and/or oxy-propylated and/or oxy-butylated), for instance Noramox® sold by the company CECA S.A., betaines and alkylbetaines, and also N-oxide derivatives of the abovementioned amines.

Among the sulfur compounds b) of the formulations according to the present invention, compounds bearing at least one sulfur atom and at least one, preferably at least two, carbon atoms are intended, and mention may be made in particular, as nonlimiting examples, of alcohols and acids comprising at least one sulfur atom, preferably in the form of a mercapto group (—SH).

Preferably compound b) is chosen from compounds bearing at least one mercapto group (—SH), more preferably from compounds bearing at least one —SH group and at least one carboxylic acid (—COOH) and/or alcohol (—OH) group. More preferably, compound b) is chosen from compounds bearing i) at least one mercapto group (—SH) and at least one carboxylic acid group and ii) at least one mercapto group (—SH) and at least one alcohol group.

According to a most particularly preferred aspect, compound b) is chosen from mercaptoethanol, mercaptopropanol, thioglycolic acid, mercaptoacetic acid, mercaptopropionic acid, to mention but the most readily available thereof, thioglycolic acid being most particularly preferred.

As indicated previously, the corrosion-inhibiting formulations known to date, and which contain at least one sulfur compound, in particular those containing thioglycolic acid, have often proven to be unstable over time (especially in a storage test at 60° C. for 8 days), insofar as they are accompanied by a strong odor that might be associated with a substantial evolution of $H_2S$ (greater than 2000 ppm). On account of this strong evolution of $H_2S$ gas and of the toxicity of this gas, these corrosion-inhibiting formulations cannot be used without suitable protection.

Thus, the addition of component c) to these formulations allows better stability over time, and a virtually total absence of evolution of unpleasant odor, in particular a virtually total absence of evolution of $H_2S$.

Component c) is at least one compound bearing at least one triazine unit. The term "compound bearing at least one triazine unit" means compounds bearing at least one, and preferably only one, triazine unit. According to a preferred embodiment of the invention, said triazine unit is preferably a hexahydrotriazine unit. According to another preferred embodiment, said triazine unit is preferably a 1,3,5-triazine unit. According to yet another preferred embodiment, said triazine unit is preferably a 1,3,5-hexahydrotriazine unit. It should also be understood that the triazine unit may be substituted as indicated later in the description.

Among the compounds bearing at least one triazine unit, the ones that are especially preferred are the compounds of formula (I) below:

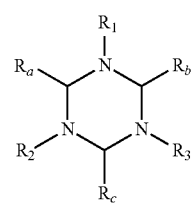

(1)

in which:
$R_1$, $R_2$ and $R_3$, which may be identical or different, are chosen, independently of each other, from a hydrogen atom, a linear or branched alkyl radical comprising from 1 to 6 carbon atoms and optionally substituted with one or more units chosen from hydroxyl (—OH) and alkoxy (—OR), where R represents a linear or branched alkyl radical comprising from 1 to 6 carbon atoms, and $R_a$, $R_b$ and $R_c$, which may be identical or different, are chosen, independently of each other, from a hydrogen atom and a linear or branched alkyl radical comprising from 1 to 6 carbon atoms.

The term "linear or branched alkyl radical" preferably means methyl, ethyl, n-propyl, 2-ethylmethyl, iso-propyl, n-butyl, iso-butyl, tert-butyl, n-pentyl, iso-pentyl, tert-pentyl, and linear or branched hexyl radicals, more preferably methyl, ethyl, n-propyl, 2-ethylmethyl, iso-propyl, n-butyl, iso-butyl, tert-butyl radicals.

The compounds of formula (1) are known and commercially available or readily prepared from known procedures that are available in the scientific literature, in the patent literature, in Chemical Abstracts or on the Internet. Thus, the compounds of formula (1) may be prepared by reacting one or more amines with one or more aldehydes, as described, for example, in U.S. Pat. No. 5,554,349.

Among the compounds of formula (1), those for which $R_a$, $R_b$ and $R_c$ each represent a hydrogen atom are preferred. The compounds of formula (A) for which $R_1$, $R_2$ and $R_3$ are not hydrogen atoms are also preferred. According to another embodiment of the invention, the compounds of formula (1) for which $R_1$, $R_2$ and $R_3$ are identical are preferred. In addition, the compounds of formula (1) for which $R_1$, $R_2$ and $R_3$ are identical and are each chosen from a methyl radical, an ethyl radical, a propyl radical, a hydroxyethyl radical and a methoxypropyl radical are also preferred, and more preferably $R_1$, $R_2$ and $R_3$ are identical and each represent a methyl radical.

Particularly preferred examples of compounds of formula (1) are 1,3,5-trimethylhexahydrotriazine (CAS No. 108-74-7), 1,3,5-tris(hydroxyethyl)hexahydrotriazine (CAS No. 4719-04-04) and 1,3,5-tri(methoxypropyl)hexahydrotriazine (CAS No. 3960-05-2).

Among the components d) of the formulations according to the present invention, nonlimiting examples that may be mentioned include water and organic solvents, and also mixtures of water with at least one organic solvent. The organic solvents that may be used are preferably water-soluble organic solvents and may be chosen, for example, from alcohols and ethers and more particularly from alkanols and glycols, more particularly methanol, ethanol, glycol, monoethylene glycol (MEG), diethylene glycol (DEG), triethylene glycol (TEG), 2-butoxyethanol, and mixtures of two or more thereof in all proportions.

The formulations according to the present invention may also comprise one or more other additives, fillers, and the like, which are inert with respect to the efficiency of the corrosion-inhibiting activity and are well known to those skilled in the art in the field of extraction of hydrocarbons and other fossil or mineral ores. Among these additives, mention may be made in a nonlimiting manner of stabilizers, preserving agents, anti-UV agents, flame retardants, colorants, other $H_2S$ scavengers (as defined previously, such as aldehydes and, for example, in a nonlimiting manner, formaldehyde or glyoxal) and the like. The amount of this or these additive(s) added may vary within wide proportions, depending on the desired effect, the regulations in force, the required solubility or compatibility conditions, and the like. As a general rule, this amount ranges from a few ppm by weight to a few percent by weight, relative to the total weight of the formulation of the invention.

According to yet another aspect, the compositions of the present invention as have just been defined may be used alone, in combination, or as a mixture or in formulation with one or more other inhibitors, intended to inhibit other types of corrosion encountered in the field of hydrocarbon extraction, or alternatively intended to inhibit the formation of hydrates or the agglomeration thereof, to avoid or prevent the appearance of deposits, to avoid or prevent the growth of bacteria, to promote flow, and the like. The amount of this or these other inhibitor(s) added may vary within wide proportions, depending on the desired effect, the regulations in force, the required solubility or compatibility conditions, and the like. As a general rule, this amount ranges from 0.1% to 60%, generally from 0.5% by weight to 40% by weight, preferably from 1% to 20% by weight, relative to the total weight of the formulation. These proportions may, however, be different as a function of the desired inhibitory effect, and, for example, for inhibitors for preventing the formation or agglomeration of hydrates, the proportion between the mass of said hydrate inhibitors and that of components a), b) and c) and optionally d) may be up to a weight ratio of 30 000 per 10.

According to one embodiment of the present invention, the corrosion-inhibiting formulations contain at least one mineral antideposition composition, said antideposition composition comprising, for example, and in a nonlimiting manner, at least one compound chosen from acidic or neutralized aminophosphonates, poly(acrylic acids), poly (alkyl acrylates), copolymers based on phosphino-carboxylic acids, tannins, lignosulfonates, polyacrylamides, naphthalene-sulfonates, and the like, as described, for example, in patent application WO 2013/034846.

The anticorrosion formulations according to the invention may be prepared via any known means, and in general by simple mixing of the various components of said compositions in any order. According to one aspect of the present invention, the corrosion-inhibiting formulations of the present invention may be readily prepared from corrosion-inhibiting formulations known in the prior art, to which is added at least one compound bearing at least one triazine unit, as described previously. As a variant, the formulations according to the invention may also be prepared by adding to component d) the other components a), b) and c), and also the optional additives, in any order.

It is also possible to prepare the formulations according to the invention from known formulations, for example those described in U.S. Pat. No. 4,498,997, to which is added at least one sulfur compound as described previously, to improve the anticorrosion performance thereof, and to which is added at least one compound bearing at least one triazine unit to improve the stability on storage thereof.

The amount of compound(s) bearing at least one triazine unit present in the corrosion-inhibiting formulation according to the present invention may vary within wide proportions depending on the nature and the amount of the other components present in said formulation and is generally between 0.5% by weight and 10% by weight, preferably between 0.5% and 5% by weight, for example about 2% by weight, relative to the total weight of the formulation.

According to one embodiment of the invention, formulations in which the number of moles of compound bearing at least one triazine function, and preferably only one triazine function, is between 0.2 mol and 0.8 mol, preferably between 0.3 mol and 0.7 mol and most particularly about 0.5 mol, per mole of sulfur compound(s) (component b), are especially preferred.

As indicated previously, the addition of at least one compound bearing at least one triazine unit makes it possible not only to improve the stability on storage of a corrosion-inhibiting formulation, but also to very substantially increase the corrosion-inhibiting power thereof.

The addition of at least one compound bearing at least one triazine unit not only drastically reduces the content of sulfur decomposition products, for example $H_2S$ evolved, but also increases the anticorrosion performance of the inhibitor in question.

Thus, and according to another aspect, the present invention relates to the use of at least one compound comprising at least one triazine unit, as stabilizer and additive for improving the anticorrosion performance of a corrosion-inhibiting formulation which comprises at least one sulfur derivative.

According to a preferred embodiment, the invention relates to the use of at least one compound of formula (1) as defined previously as an additive for stabilizing and improving the anticorrosion properties of a corrosion-inhibiting formulation comprising at least one sulfur derivative. The sulfur derivatives that may be included in these corrosion-inhibiting formulations are those defined above in the description.

The addition to a corrosion-inhibiting formulation of at least one compound bearing at least one triazine function gives said formulation excellent stability over time characterized by a virtually total absence of evolution of $H_2S$, and a substantial improvement in the anticorrosion performance. For comparative purposes, as illustrated in the examples that follow, the addition of the same amount of other compounds known as $H_2S$ scavengers, such as amines, for example monoethanolamine, or aldehydes, for example formaldehyde or glyoxal, do not have satisfactory activity as regards the stability, and do not prevent the evolution over time of large amounts of $H_2S$.

By means of the present invention, it is now possible to have corrosion-inhibiting formulations comprising a sulfur product, such as thioglycolic acid or equivalents, which are stable on storage, which do not develop nauseating odors on storage, which do not give off toxic gas, in particular $H_2S$. In addition, the anticorrosion performance of the corrosion-inhibiting formulations according to the invention is improved, in comparison with the corresponding formulations that do not contain any compound(s) comprising at least one triazine unit.

Thus, and according to yet another aspect, the present invention relates to the use of the corrosion-inhibiting formulations according to the invention for the treatment, advantageously the preventive treatment, of corrosion of corrodable metal pipes in contact with corrosive media in the oil, gas and mining industry.

Specifically, during the extraction of hydrocarbons (or production of hydrocarbons), more particularly during the extraction of crude oil or the extraction of gas from subsurface layers, or even of ore, water and gases are generally simultaneously produced with the hydrocarbons or ore, and are raised to the surface. The presence of water, in more or less large amounts, is thus inherent in the extraction of underground hydrocarbons and ore, and is the origin of numerous problems that disrupt the production lines.

Specifically, this presence of water, especially in the presence of the extracted gases, is very often responsible for the corrosion of the pipes, pipework, tubes, valves and other metal components. In addition, in certain cases, this water is reinjected into the subsurface layers as an extraction auxiliary.

The corrosion-inhibiting formulations according to the present invention thus find an entirely advantageous use in all the fields of the oil and gas industry, and more specifically in any type of industry for the drilling, completion, stimulation and production of ore or of fossil compounds, such as gas, oil, bitumen and the like, for instance, in a nonlimiting manner, in the techniques of drilling, of fracturing by injection of fluid, of acidification of fossil compound reservoirs, of injection of fluids into subsurface reservoirs containing fossil compounds, and also in the techniques for the enhanced production and recovery thereof.

These formulations may be injected according to any method that is well known to those skilled in the art, in continuous, batch or squeeze mode, preferably in continuous mode, in extraction lines, in lines for injection of production waters, and generally in any aqueous, organic or aqueous-organic fluid used in extraction fields. It is also possible, for example, to inject these formulations via a "gas-lift" system, which is well known to those skilled in the art.

The amount injected of corrosion-inhibiting formulation(s) according to the invention may vary within wide proportions, according to the needs and the nature and the composition of the extracted products. As a general rule, the injected amount is between 1 ppm and 1000 ppm, preferably between 50 ppm and 800 ppm, where "ppm" represents parts by weight of corrosion-inhibiting formulation(s) per million parts by volume of aqueous, organic or aqueous-organic fluid to be treated.

The nonlimiting examples that follow make it possible to illustrate and to understand the invention more clearly, without limiting the scope thereof.

EXAMPLES

Measurement Methods

Measurement of the Amount of $H_2S$ Evolved 50 ml of corrosion-inhibiting formulation to be tested are placed in a 100 ml flask. The flask is closed hermetically and stored at 60° C. for eight days. The amount of $H_2S$ evolved is then measured by taking a sample of gaseous phase using a pump equipped with a Dräger tube. The gas passes through the tube, the color change of which indicates the amount of $H_2S$ evolved.

Measurement of the Corrosion Rate

The anticorrosion efficiency is expressed in the form of the corrosion rate of a carbon steel as a function of time. The corrosion rate of a steel is determined by the LPR (Linear Polarization Resistance) method. In the presence of a corrosion inhibitor, the lower the corrosion rate, the more efficient the inhibitor.

The measurements of corrosion rate via the LPR method are performed under the following conditions: the corrosive medium is an aqueous solution of sodium chloride (NaCl) at 30 g/l. This solution is deaerated beforehand by sparging with nitrogen, for at least one hour. It is finally saturated with carbon dioxide ($CO_2$). Sparging with $CO_2$ is continued throughout the test. The working temperature is 80° C. The tests are performed by introducing at time t=100 minutes 50 ppm (weight/volume) of corrosion-inhibiting formulation.

The efficiency of the corrosion inhibitor is expressed as a percentage efficiency, according to the following relationship:

$$\% \ Eff(IC) = \frac{[(Vcor_1) - (Vcor_2)]}{(Vcor_1)} \times 100$$

in which: % Eff (IC) represents the percentage efficiency of the anticorrosion formulation, Vcor1 represents the corrosion rate in the absence of anticorrosion formulation and Vcor2 represents the corrosion rate in the presence of anticorrosion formulation.

However, it is common practice in the field of anticorrosion to consider only the residual corrosion rate (i.e. after treatment or after injection of the anticorrosion formulation). The lower this residual corrosion rate, the more efficient the anticorrosion formulation. An efficient anticorrosion formulation, at a given dose, generally has a residual corrosion rate of steel of less than 0.1 mm/year.

The corrosion rate of carbon steel is measured via the method of measuring the polarization resistance, which is known in the art, on a system with three electrodes: carbon steel working electrode, platinum counter electrode and saturated calomel reference electrode.

These three electrodes are placed in the jacketed glass cell containing 600 ml of corrosive medium. This corrosive medium is a synthetic solution of the same composition as the water of the site where there is corrosion. This medium is saturated by sparging with $CO_2$ throughout the experiment. The working temperature is 80° C.

The corrosion rates in the absence and in the presence of anticorrosion formulation are measured and monitored as a function of time using a Gamry potentiostat.

Example 1: Tests Based on a 2-in-1 Anticorrosion and Mineral Antideposition Formulation The anticorrosion formulations tested are the following:
Reference formulation R1: anticorrosion and antideposition formulation, comprising:
  Norust® 740 (CECA S.A.): 9%
  Inipol® AD 425C (Mineral antideposition CECA S.A.): 18%
  Noramox® C11 (CECA S.A.): 12%
  Thioglycolic acid (Arkema France): 5%
  Glycol-based solvent: qs 100%.
Comparative formulation C1: formulation R1 to which were added 2% by weight, relative to the total weight of the formulation, of monoethanolamine from the company VWR.
Formulation according to the invention Inv1: formulation R1 to which were added 3% by weight, relative to the total weight of the formulation, of 1,3,5-trimethylhexahydrotriazine from the company Taminco, at 42% in water, i.e. about 1.3% of pure product.

The amounts of $H_2S$ evolved (Q-$H_2S$) after storage at 60° C. for 8 days are presented in table 1 below:

TABLE 1

|  | R1 | C1 | Inv1 |
| --- | --- | --- | --- |
| Q-$H_2S$ (ppm) | >>2000 | >1000 | 2 |

These results clearly show that a corrosion-inhibiting formulation containing thioglycolic acid (added to increase the anticorrosion efficiency) is unstable and gives off a large amount of $H_2S$.

The addition of monoethanolamine to the reference corrosion-inhibiting formulation R1 comprising thioglycolic acid makes it possible to reduce the amount of $H_2S$ evolved. This amount however remains high and is unacceptable on account of the high toxicity of $H_2S$. On the other hand, the addition of a compound comprising a triazine unit makes it possible to drastically reduce the amount of $H_2S$ evolved, to levels in the region of zero.

The results of the anticorrosion efficiency study of the 2-in-1 formulations are presented in the graph in FIG. 1, in which:
  ▲ represents the values measured with the reference formulation R1, and
  ● represents the values measured with the formulation according to the invention Inv1.

These results show, surprisingly, that the addition of a compound bearing a triazine unit, for stabilizing the formulation, not only does not disrupt the anticorrosion efficiency of the same composition, not comprising said stabilizer, but also further increases this anticorrosion efficiency.

Example 2: Tests Based on Formulations that are Solely Corrosion-Inhibiting

The following anticorrosion formulations were tested:
Reference formulation R2:
  Norust® 730 (CECA S.A.): 50%
  Alkylimidazoline: 19%
  Thioglycolic acid (Arkema France): 5%
  Acetic acid: 6%
  Water: 6%
  Glycol-based solvent: qs 100%.
Comparative formulation C2: formulation R2 to which were added 10% by weight of formaldehyde from the company VWR at 30% by weight in a water/methanol mixture, relative to the total weight of the formulation.
Formulation according to the invention Inv2a: formulation R2 to which were added 10% by weight, relative to the total weight of the formulation, of 1,3,5-trimethylhexahydrotriazine from the company Taminco, at 42% in water.
Formulation according to the invention Inv2b: formulation R2 to which were added 5% by weight, relative to the total weight of the formulation, of 1,3,5-trimethylhexahydrotriazine from the company Taminco, at 42% in water, and 5% of formaldehyde at 30% in a water/methanol mixture, from the company VWR.

The amounts of $H_2S$ evolved (Q-$H_2S$) after storage at 60° C. for 8 days are presented in table 2 below:

TABLE 2

|  | R2 | C2 | Inv2a | Inv2b |
| --- | --- | --- | --- | --- |
| Q-$H_2S$ (ppm) | >>2000 | 20 | 20 | 0 |

As previously, these results also show that this other corrosion-inhibiting formulation containing thioglycolic acid is unstable and gives off a large amount of $H_2S$.

A stabilization test with formaldehyde (formulation C2) shows that it is necessary to add a large amount of this product, which is now considered as toxic.

Another test (formulation Inv2b) shows that the addition of a small amount of aldehyde and of compound bearing a triazine function to this reference formulation R2 leads to excellent stability, no evolution of $H_2S$ gas having been observed after storage for 8 days at 60° C.

The preceding examples thus show the very great advantages afforded by the addition, to a corrosion-inhibiting composition, of at least one compound bearing a triazine

The invention claimed is:

1. A corrosion-inhibiting formulation comprising:
   a) at least one amine or amine derivative,
   b) at least one sulfur compound,
   c) at least one compound bearing at least one triazine unit, and
   d) optionally a solvent or a mixture of two or more solvents, wherein component b) is selected from the group consisting of compounds bearing at least one —SH group and at least one carboxylic acid (—COOH) and/or alcohol (—OH) group.

2. The formulation as claimed in claim 1, wherein component a) is selected from the group consisting of amines, ethoxylated amines, amino acids, imidazolines, and also derivatives thereof and salts thereof, fatty amines, fatty amine derivatives, imidazolines substituted with at least one fatty chain, ester amines, ether amines, alkylamines, oxyalkylated amines, betaines and alkylbetaines, and also N-oxide derivatives of the abovementioned amines.

3. The formulation as claimed in claim 1, wherein component b) is selected from the group consisting of mercaptoethanol, mercaptopropanol, thioglycolic acid, mercaptoacetic acid, and mercaptopropionic acid.

4. The formulation as claimed in claim 1, wherein component c) is selected from the group consisting of the compounds of formula (1) below:

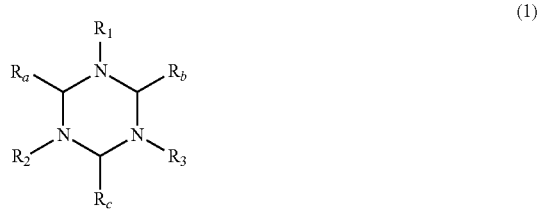

in which:
   $R_1$, $R_2$ and $R_3$, which may be identical or different, are chosen, independently of each other, from a hydrogen atom, a linear or branched alkyl radical comprising from 1 to 6 carbon atoms and optionally substituted with one or more units chosen from hydroxyl (—OH) and alkoxy (—OR), where R represents a linear or branched alkyl radical comprising from 1 to 6 carbon atoms, and
   $R_a$, $R_b$ and $R_c$, which may be identical or different, are chosen, independently of each other, from a hydrogen atom and a linear or branched alkyl radical comprising from 1 to 6 carbon atoms.

5. The formulation as claimed in claim 4, wherein component c) is selected from the group consisting of the compounds of formula (1) for which $R_a$, $R_b$ and $R_c$ each represent a hydrogen atom and $R_1$, $R_2$ and $R_3$ are not hydrogen atoms.

6. The formulation as claimed in claim 4, wherein component c) is selected from the group consisting of the compounds of formula (1) for which $R_1$, $R_2$ and $R_3$ are identical.

7. The formulation as claimed in claim 4, wherein component (c) is selected from the group consisting of the compounds of formula (1) for which $R_1$, $R_2$ and $R_3$ are identical and are each selected from the group consisting of a methyl radical, a hydroxyethyl radical and a methoxypropyl radical.

8. The formulation as claimed in claim 1, wherein the amount of component c) is between 0.5% by weight and 10% by weight, relative to the total weight of the formulation.

9. The formulation as claimed in claim 1, wherein the compound comprising at least one triazine unit is selected from the group consisting of 1,3,5-trimethylhexahydrotriazine, 1,3,5-tris(hydroxyethyl)hexahydrotriazine and 1,3,5-tri(methoxypropyl)hexahydrotriazine.

10. The formulation as claimed in claim 1, additionally comprising a component d) which is a solvent or a mixture of two or more solvents.

11. The formulation as claimed in claim 1, wherein the solvent(s) is (are) selected from the group consisting of water and water-soluble organic solvents.

12. The formulation as claimed in claim 1, wherein the amount of component c) is between 0.5% and 5% by weight.

13. The formulation as claimed in claim 1, wherein component c) is a compound bearing only one triazine unit.

14. The formulation as claimed in claim 13, wherein the triazine unit is a hexahydrotriazine unit.

15. The formulation as claimed in claim 13, wherein the triazine unit is a 1,3,5-triazine unit.

16. The formulation as claimed in claim 1, wherein component a) represents from 50% to 90% by weight, limits inclusive, relative to the total weight of components a)+b)+c), component b) represents from 1% to 30% by weight, limits inclusive, relative to the total weight of components a)+b)+c), and component c represents from 0.5% to 15 by weight, limits inclusive, relative to the total weight of components a)+b)+c).

17. A method for treating the corrosion of metal conduits that are corrodable on contact with corrosive media in the oil, gas and mining industry, wherein the method comprises using a corrosion-inhibiting formulation in accordance with claim 1.

* * * * *